Oct. 6, 1970     M. L. CARTON     3,532,396
CONTROL VALVE
Filed Sept. 25, 1968

INVENTOR
MICHAEL L. CARTON
BY
Joseph E. Papin.

United States Patent Office 3,532,396
Patented Oct. 6, 1970

3,532,396
CONTROL VALVE
Michael L. Carton, Clayton, Mo., assignor to Wagner Electric Corporation, Newark, N.J., a corporation of Delaware
Filed Sept. 25, 1968, Ser. No. 762,496
Int. Cl. B60t 15/36
U.S. Cl. 303—71                                    24 Claims

ABSTRACT OF THE DISCLOSURE

A control valve for use in an air brake system for selectively exhausting applied fluid pressure from a spring set brake actuating chamber to controllably effect energization of a brake. The control valve includes a pair of resiliently urged members for controlling the application to said brake of fluid pressure supplied from a source thereof, and one of said resiliently urged members being movable toward a position isolating the applied fluid pressure from the supplied fluid pressure and thereafter metering the applied fluid pressure to the atmosphere and the other of said resiliently urged members being responsive to the isolated supplied fluid pressure and the metered reduction of the applied fluid pressure for following engagement with said one resiliently urged means to effect the isolation of the reduced applied fluid pressure from the atmosphere.

---

This invention relates to control valves and in particular to control valves of the push-pull type.

In the past, a well-known device for effecting the energization of vehicle brakes in a vehicle fluid pressure system was a spring set brake chamber having a service portion responsive to service fluid pressure metered thereto from a system fluid pressure source to effect normal service energization of said vehicle brakes and having an emergency or parking portion including resiliently urged means responsive to fluid pressure less than a predetermined value supplied thereto from said system fluid pressure source to mechanically actuate said service portion and effect emergency energization of the vehicle brakes. A push-pull control valve of the well-known manually operated type was connected between the emergency portion of the spring set brake chamber and the system fluid pressure source, and said push-pull control valve was operable between one position connecting the emergency portion of said spring set brake chamber in open pressure fluid communication with said system fluid pressure source to disable said resiliently urged means and another position interrupting pressure fluid communication therebetween and venting said emergency portion of said spring set brake chamber to the atmosphere to effect actuation of said resiliently urged means and simulate emergency energization of the vehicle brakes. One of the disadvantageous or undesirable features of such past push-pull control valves was that they did not afford the operator a "feel" as to the extent or intensity of the simulated emergency energization of the vehicle brakes. Another disadvantageous or undesirable feature of such past push-pull valves was the inability thereof to meter or modulate in response to the operator applied actuating force thereon.

The principal object of the present invention is to provide a control valve which overcomes the aforementioned disadvantageous or undesirable features of such past push-pull control valves, and this, as well as other objects and advantages of the present invention, will become apparent hereinafter.

Briefly, the invention embodies a control valve having a pair of resiliently urged means for controlling the application therethrough of supplied fluid pressure, one of said resiliently urged means being movable toward a position isolating the applied fluid pressure from the supplied fluid pressure and venting the supplied fluid pressure to the atmosphere, and the other of said resiliently urged means being responsive to the isolated supplied fluid pressure and the reduced applied fluid pressure for following engagement with said one resiliently urged means to isolate the applied fluid pressure from the atmosphere.

Figure 1:
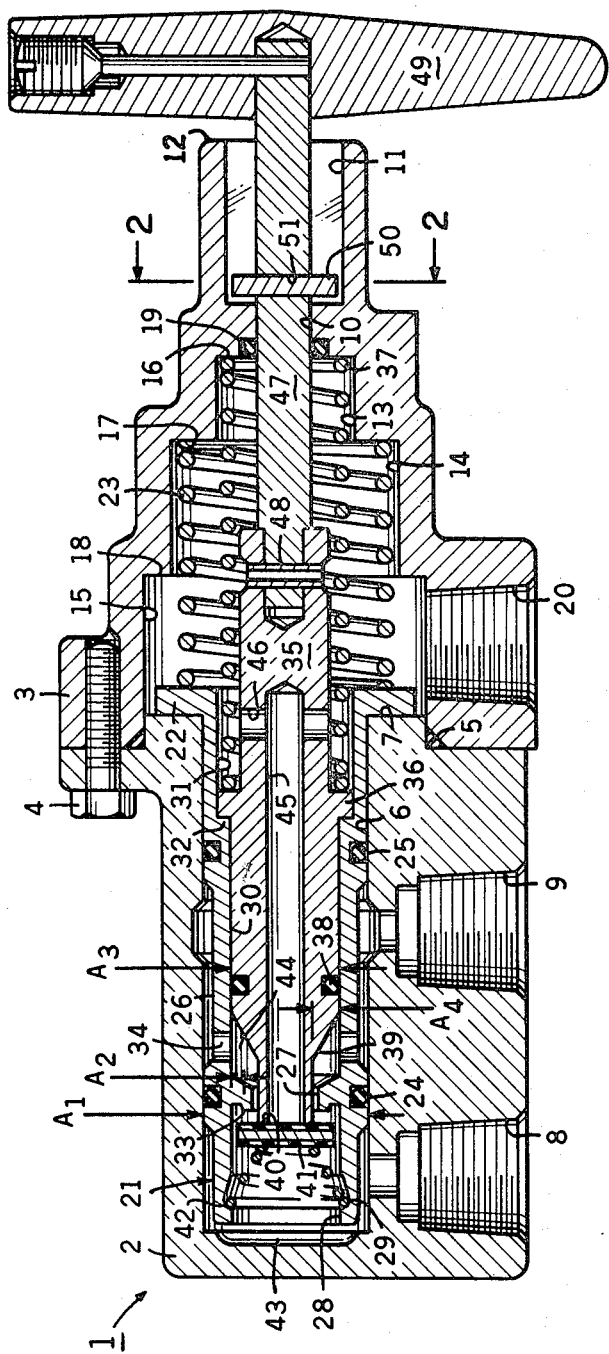
Figure 2:
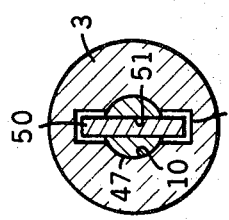

In the drawings which form a part of the specification,
FIG. 1 is a sectional view showing a control valve embodying the present invention in cross-section; and
FIG. 2 is a sectional view taken along line 2—2 of FIG. 1.

Referring now to the drawings in detail, a control valve 1 is provided with leftward and rightward housing portions 2, 3 which are connected against displacement by suitable means, such as a plurality of studs 4, and a seal 5 is disposed between said housings. The housing 2 is provided with a blind bore 6 therein having a radial shoulder or abutment 7 about the open end thereof on said housing, and inlet and outlet ports 8, 9 are also provided in said housing respectively intersecting with said blind bore adjacent to the end wall and mid-portion thereof, said inlet and outlet ports being respectively adapted for connection with a fluid pressure source and fluid pressure responsive motor. The housing 3 is provided with a bore 10 having its rightward end connected with a key-type slot 11, and the rightward end of said housing about said slot defines a key abutment 12, to be discussed hereinafter. Stepped counterbores 13, 14 and 15 are coaxially provided in the housing 3 connecting with the leftward end of the bore 10 and the righward end of the blind bore 6, and shoulders or abutments 16, 17 and 18 are respectively provided on said housing at the junctures of the bore 10 and the counterbore 13, the counterbores 13, 14 and the counterbores 14, 15. A seal 19 is disposed in the bore 10, and an exhaust port 20 is provided in the housing 3 intersecting with the larger stepped counterbore 15.

An application or resiliently urged member, such as the piston 21, is slidably received in the blind bore 6 having a radially extending flange or abutment 22 on the rightward end thereof normally urged into engagement with the housing shoulder 7 by the compressive force of a spring 23 biased between said flange and the housing shoulder 17. Spaced seals 24, 25 are disposed on the peripheral portion of the piston 21 in sealing engagement with the blind bore 6 between the inlet and outlet ports 8, 9 and between said outlet port and the housing shoulder 7, respectively, and a peripheral groove 26 is provided in said piston between said seals and connected in pressure fluid communication with said outlet port at all times. A bore 27 is provided in the piston 21 interposed between a counterbore 28 which intersects the leftward end of said piston having a spring retaining groove 29 therein and between stepped counterbores 30, 31 which intersect with the rightward end of said piston. An annular shoulder or abutment 32 is provided on the piston 21 at the juncture of the stepped counterbores 30, 31, and another annular shoulder defining a valve seat 33 is provided on said piston at the juncture of the bore 27 and counterbore 28. A cross-passage 34 is provided in the piston 21 having one end intersecting with the peripheral groove 27 and the other end thereof intersecting with the piston smaller stepped counterbore 30.

Another application or resiliently urged member, such as the piston or stem 35, is slidably received in the piston smaller stepped counterbore 30 having a radially extending flange or abutment 36 adjacent the mid-portion thereof normally urged into engagement with the piston shoulder 32 by the compressive force of a spring 37 biased between said flange and the housing shoulder 16. A seal 38 is disposed on the peripheral portion of the stem 35 in sealing engagement with the piston smaller stepped counterbore 30 between the connecting passage 34 and the shoulder 32. The stem 35 is provided with a reduced leftward end portion or extension 39 which normally protrudes coaxially through the piston bore 27 into the piston counterbore 28 when the stem flange 36 is engaged with the piston shoulder 32, and a valve seat 40 is provided on the free end of said extension normally sealably engaged with a valve member or element 41 urged thereinto by the negligible force of a valve spring 42 engaged between said valve member and piston spring retaining groove 29. The portion of the blind bore 6 leftwardly of the piston seal 24 and the piston counterbore 28 defines an inlet chamber 43 upstream or leftwardly of the piston valve seat 33 in open pressure fluid communication with the inlet port 8, and an outlet chamber 44 is defined on the downstream or rightward side of said piston valve seat including the piston bore 27, the portion of the piston counterbore 30 between said piston bore and the stem seal 26, the cross-passages 34, and the piston peripheral groove 26, said outlet chamber being connected in open pressure fluid communication with the outlet port 9 at all time. An exhaust passage 45 is axially provided in the stem 35 having one end thereof intersecting the free end of the extension 39 and extending through the stem valve seat 40 while the other end thereof intersects with a cross-passage 46 which is connected in pressure fluid communication with exhaust port 20 at all times through the housing counterbore 15. The stem 32 includes an actuating rod 47 which is fixedly connected thereto by suitable means, such as a pin 48, and said actuating rod is slidably received in the housing bore 10 in sealing engagement with the seal 19. The rod 47 also extends through the housing slot 11 having a handle portion 49 fixedly connected to the exterior end thereof, and a guide pin or key 50 is pressed into a cross-passage 51 provided in the mid-portion of said rod for guiding engagement with said slot and for positioning or abutting engagement with the key abutment 12, as discussed hereinafter.

It should be noted that the piston 21 is provided with an effective area $A_1$ and an annular effective area $A_2$ respectively defined by the engagement of the seal 24 with the housing blind bore 6 and between the piston counterbore 30 and the valve seat 33, said areas $A_1$, $A_2$ being respectively subjected to the fluid pressure at the inlet and outlet port 8, 9 when the valve member 41 is engaged with said valve seat, as discussed hereinafter. To complete the description of the control valve 1, the stem 35 is provided with an effective area $A_3$ and an annular effective area $A_4$ respectively defined by the sealing engagement of the seal 38 with the piston counterbore 30 and between said counterbore and valve seat 33, said areas $A_3$, $A_4$ being subjected to the fluid pressure at the outlet port 9 when the valve member 41 is engaged with said valve seat and disengaged therefrom, respectively.

In the operation with the component parts of the control valve 1 in their "in" or inoperative positions, as shown in the drawings and as described hereinabove, input or supplied fluid pressure $Pi$ supplied to the inlet port 8 acts on the effective area $A_1$–$A_2$ of the piston 21 to establish a force $Pi$ ($A_1$–$A_2$) which is substantially balanced by the compressive force $Fc$ of the spring 23 to maintain said piston in its "in" position with the flange 22 thereof engaged with the housing shoulder 7. The input fluid pressure $Pi$ flows from the inlet port 8 through the housing blind bore 6 into the counterbore 28 of the piston 21 and therefrom through the piston bore 27, the counterbore 30, the cross-passages 34 and the peripheral groove 26 to establish a substantially equal output or applied fluid pressure $Po$ at the outlet port 9. The output fluid pressure $Po$ acts on the effective area $A_3$ of the stem 35 to establish an output force $Po$ $A_3$ which is substantially balanced by the compressive force $Fs$ of the spring 37 to maintain said stem in its "in" position with the flange 36 thereof engaged with the piston shoulder 32.

In the event the operator desires to decrease or exhaust the output fluid pressure $Po$ at the outlet port 9 to the atmosphere, a rightwardly directed manual force is applied to the exterior end or handle 49 of the stem 35 to move said stem toward the "out" or metering position thereof against the force $Fs$ of the spring 37. This rightward movement of the stem 35 initially engages the valve member 41 with the piston valve seat 33 isolating the input fluid pressure $Pi$ at the inlet port 8 from the output fluid pressure $Po$ at the outlet port 9, and the stem flange 36 is also disengaged from the piston shoulder 32 upon such initial rightward movement of said stem. In this manner, the initial rightward movement of the stem 35 moves the valve member 41 to a lapped position, i.e., in lapped engagement with both the piston and stem valve seats 33, 40 isolating the inlet and outlet ports 8, 9 from each other. Furher rightward movement of the stem 35 disengages the valve seat 40 thereof from the valve member 41 to establish limited pressure fluid communication between the outlet and exhaust ports 9, 20 and thereby effect metered pressure fluid flow from said outlet port through the piston peripheral groove 26, the cross-passages 34 and the counterbore 30 to the stem passage and cross-passages 45, 46 and therefrom through the housing counterbore 15 to said exhaust port. The force $Po$ $A_3$ is eliminated upon the disengagement of the stem valve seat 40 from the valve member 41 and is replaced by the force $P_{or}$ $A_4$ of the reduced output fluid pressure acting on the area $A_4$ which is also additive to the rightwardly directed manual force; however, since the force $P_{or}$ $A_4$ is less than the force $Po$ $A_3$, the force $Fs$ of the spring 37 tends to urge said stem leftwardly against the additive manual force and the force $P_{or}$ $A_4$ thereby providing the operator with a "feel" as to the extent of the application. Upon the metered reduction of the output fluid pressure $P_{or}$ when the valve member 41 is engaged with the piston valve seat 33, the force $Pi$ ($A_1$–$A_2$) is also eliminated and replaced by the force of the inlet fluid pressure $Pi$ acting on the area $A_1$ against the metered reduced output fluid pressure $P_{or}$ acting on the area $A_2$; therefore, it is obvious that the metered reduction of the output fluid pressure $P_{or}$, as described above, effects a corresponding increase in the differential force $Pi$ $A_1$–$P_{or}$ $A_2$ which urges the piston 21 rightwardly against the force $Fc$ of the spring 22 in follow-up relation with the rightward metering movement of the stem 35. In this manner, the follow-up movement of the piston 21 again moves the valve member 41 into lapped engagement with the piston and stem valve seats 33, 40 thereby isolating the outlet port 9 from both the inlet and exhaust ports 8, 20. With the valve member 41 again in its lapped position, the force $Fc$ of the spring 23 substantially balances the differential force $Pi$ $A_1$–$P_{or}$ $A_2$, and the force $Fs$ of the spring 37 substantially balancesthe additive rightwardly directed manual force and the force $P_{or}$ $A_4$. If further actuation is desired, the rightward manually applied force on the stem 35 is increased which results in a further decrease of the force $P_{or}$ $A_4$ and a further increase in the differential force $Pi$ $A_1$–$P_{or}$ $A_2$, and the component parts of the control valve 1 function in the same manner as previously described to again re-locate the valve member 41 in lapped engagement between the piston and stem valve seats 33, 47.

If the operator now desires to completely exhaust the outlet port 20, the rightwardly directed manually applied force is increased to overcome the force $F_s$ of the spring 37 and move the stem 35 rightwardly to its "out" position. This rightward movement of the stem 35 to its "out" position disengages the valve seat 40 thereof from the valve member 41 to effect unlimited pressure fluid communication between the inlet and exhaust ports 9, 20 so that the output fluid pressure $P_{or}$ "dumped" to the atmosphere instead of being metered as previously described hereinbefore. When the output fluid pressure $P_{or}$ is so exhausted, the force $P_{or} A_3$ is eliminated so that the force $F_s$ of the spring 37 is opposed only by the manually applied force. In other words, the operator feels the spring force $Fs$ acting against the manually applied force. At the same time, the exhaustion of the output fluid pressure $P_{or}$ also eliminates the force $P_{or} A_2$, and the force $Pi A_1$ is therefore correspondingly increased to move the piston 21 toward its "out" position in follow-up relation with the stem 35 against the force $Fc$ of the spring 23; however, the follow-up movement of said piston in response to the force $Pi A_1$ engages the piston flange 22 with the housing shoulder 18 to prevent the re-engagement of the valve member 41 with the stem valve seat 40 when the stem 35 is in its "out" position. In this manner, the engagement of the piston flange 22 with the housing shoulder 18 not only defines the "out" position of the piston 21 but also maintains the valve member 41 in predetermined spaced relation with the stem valve seat 40 when the stem 35 is in its "out" position to insure unmetered or open pressure fluid communication between the outlet and exhaust ports 9, 20 through the piston peripheral groove 26, the cross-passages 34 and the counterbore 30 and through the stem passage and cross-passages 45, 46 to the housing counterbore 15.

During the movement of the stem 35 to its "out" position, the pin 50 is slidable through the housing slot 11 and exteriorly of the housing 2, and rotation of the handle 49 and stem 35 through an angle of approximately 90° places said pin in cross-relation relative to said housing slot and in abutting engagement with the housing abutment 12. In this manner, the abutting or holding engagement between the pin 50 and the housing abutment 12 contains the force $Fs$ of the spring 37 to mechanically maintain the stem 35 in its "out" position, and with the spring force $Fs$ so contained, said stem is mechanically maintained in its "out" position upon the subsequent release or elimination of the rightwardly directed manually applied force by the operator.

The embodiments of the invention in which an exclusive property or privilege is claimed are defined as follows:

1. A control valve comprising a housing, a pair of application means movable in said housing for controlling the application through said housing of fluid pressure supplied thereto, one of said application means being movable in one direction relative to the other of said application means in response to an applied force toward a position in said housing isolating the supplied fluid pressure from the applied fluid pressure and effecting a metered reduction of the applied fluid pressure to the atmosphere, opposed effective areas on said other application means respectively responsive to the isolated supplied fluid pressure and the reduced applied fluid pressure to establish a differential force urging said other application means toward following engagement with said one application means to isolate the reduce applied fluid pressure from the atmosphere, said one and other application means including one and other resiliently urged means, respectively, said one resiliently urged means being movable against its own force in response to the applied force and said other resiliently urged means being also movable against its own force in response to the differential force acting thereon, and a third area on said one resiliently urged means subjected to the applied fluid pressure to establish another force urging said one resiliently urged means against its own force.

2. The control valve according to claim 1, wherein one of the opposed areas responsive to the isolated supplied fluid pressure is greater than the other of said opposed areas responsive to the reduced applied fluid pressure.

3. The control valve according to claim 1, comprising abutement means on said housing, said other resiliently urged means being normally urged into engagement with said abutment means and being disengaged therefrom upon its following movement, and other abutment means on said other resiliently urged means, said one resiliently urged means being normally urged into engagement with said other abutment means and being disengaged therefrom upon its applied force movement.

4. The control valve according to claim 3, wherein said one resiliently urged means is further movable in response to the applied force toward a dumping position in said housing disengaged from said other resiliently urged means to effect the complete exhaustion of the applied fluid pressure to the atmosphere, and an abutment on said housing predeterminately spaced from said first named abutment means for engagement with said other resiliently urged means to limit the following movement thereof when said one resiliently urged means is moved to its dumping position.

5. The control valve according to claim 4, comprising holding means on said one resiliently urged means and movable into holding engagement with said housing upon the movement of said one resiliently urged means into its dumping position to mechanically contain the force of said one resiliently urged means and maintain said one resiliently urged means in its dumping position thereby permitting the removal of the applied force from said one resiliently urged means.

6. The control valve according to claim 1, wherein said one and other resiliently urged means define with said housing a pressure fluid flow passage for the application therethrough of the supplied fluid pressure, said one resiliently urged means being movable relative to said other resiliently urged means in response to the applied force toward a position in said flow passage isolating the supplied fluid pressure in one portion thereof from the applied fluid pressure in another portion thereof and thereafter establishing metered pressure fluid communication between said flow passage other portion and the atmosphere to effect the metered reduction of the applied fluid pressure, one of said opposed areas being responsive to the isolated fluid pressure in said flow passage one portion and the other of said opposed areas being responsive to the reduced applied fluid pressure in said flow passage other portion to establish the differential force urging said other resiliently urged means toward following engagement with said one resiliently urged means to interrupt the pressure fluid communication between said flow passage other portion and the atmosphere.

7. The control valve according to claim 6, comprising valve means for engagement with one of said one and other resiliently urged means and movable in said flow passage for controlling pressure fluid flow therethrough, said valve means being movable toward a position in said flow passage isolating the one and other portions thereof upon the applied force movement of said one resiliently urged means.

8. The control valve according to claim 7, comprising a valve seat on the other of said one and other resiliently urged means about said flow passage and between said one and other portions thereof, said valve means movable into engagement with said valve seat to isolate said one and other flow passage portions upon the applied force movement of said one resiliently urged means.

9. The control valve according to claim 8, comprising another valve seat on said one resiliently urged means between said flow passage other portion and the atmosphere for engagement with said valve means, said other valve seat being disengaged from said valve means to establish pressure fluid communication between said flow passage other portion and the atmosphere and effect the metered reduction of the applied fluid pressure upon the applied force movement of said one resiliently urged means subsequent to the engagement of said valve means with said first named valve seat, and the following movement of said other resiliently urged means in response to the differential force thereafter moving said valve means toward re-engagement with said other valve seat to interrupt pressure fluid communication between said flow passage other portion and the atmosphere.

10. The control valve according to claim 9, comprising extension means on said one resiliently urged means having a free end portion defining said other valve seat and movable through said first named valve seat for engagement with said valve means, exhaust passage means in said one resiliently urged means and extension means extending through said other valve seat, said one resiliently urged means normally urging said other valve seat into engagement with said valve means to close said exhaust passage means and also normally urging said valve means toward a position disengaged from said first named valve seat and permitting the application through said flow passage of the supplied fluid pressure, said one resiliently urged means being initially movable in response to the applied force to permit movement of said valve means into engagement with said first named valve seat and thereafter further movable relative to said valve means to disengage said other valve seat from said valve means to open said exhaust passage means and effect the metered reduction of the applied fluid pressure, and said valve means being re-engaged with said other valve seat to close said exhaust passage mean upon the following movement of said other resiliently urged means in response to the differential force.

11. The control valve according to claim 10, wherein said one resiliently urged means includes a first member movable in said housing, and first resilient means engaged between said first member and said housing, and said other resiliently urged means including a second member movable in said first member and defining therewith said flow passage, and second resilient means engaged between said second member and housing, said first named valve seat being on said first member, said valve means being movable in said first member and urged toward said first named valve seat, said extension means and other valve seat being on said second member and said exhaust passage being in said second member, said first and second members being movable against said first and second resilient means in response to the applied force and the differential force, respectively.

12. The control valve according to claim 1, wherein said one and other resiliently urged means define with said housing a pair of chambers respectively subjected to the supplied and applied fluid pressures, passage means in said other resiliently urged means between said chambers, a valve seat on said other resiliently urged means about said passage means, valve means movable in one of said chambers for engagement with said valve seat, exhust passage means in said one resiliently urged means for connection with the other of said chambers, and another valve seat on said one resiliently urged means about said exhaust passage means for engagement with said valve means, said one resiliently urged means normally urging said other valve seat into engagement with said valve means closing said exhaust passage means and urging said valve means toward a position disengaged from said first named valve seat and establishing pressure fluid communication between said chambers through said first named passage means, said one resiliently urged means being initially movable in response to the applied force to engage said valve means with said first named valve seat closing said first named passage means and being thereafter further moveable relative to said valve means toward a position disengaging said other valve seat therefrom to open said exhaust passage means and effect the metered reduction of the applied fluid pressure therethrough from said other chamber, said valve means being re-engaged with said other chamber, said valve means being re-engaged with said other valve seat upon the following movement of said other resiliently urged means in response to the differential force.

13. A control valve comprising a housing having inlet, outlet and exhaust ports therein, a pair of members movable in said housing and controlling pressure fluid communication between said inlet, outlet and exhaust ports, one of said members being movable relative to the other of said members in response to an applied force toward an operative position in said housing interrupting pressure fluid communication between said inlet and outlet ports and establishing metered pressure fluid communication between said outlet and exhaust ports to effect a metered reduction of the fluid pressure at said outlet port, opposed areas on said other member respectively subjected to the fluid pressure at said inlet and outlet ports, said opposed areas being respectively responsive to the fluid pressure at said inlet port and the reduced fluid pressure at said outlet port upon the actuation of said one member to establish a differential force urging said other member toward following engagement with said one member to interrupt the metered pressure fluid communication between said outlet and exhaust ports, and a third area on said one member subjected to the fluid pressure at said outlet port, said third area being responsive to the fluid pressure at said outlet port to establish another force additive to the applied force and urging said one member against one of said resilient means.

14. The control valve according to claim 13, wherein one of said opposed areas subjected to the fluid pressure at said inlet port is greater than the other of said opposed areas subjected to the fluid pressure at said outlet port.

15. The control valve according to claim 13, wherein one of said opposed areas responsive to the fluid pressure at said inlet port is greater than the other of said areas responsive to the reduced fluid pressure at said outlet port to establish the differential force urging said other member against the other of said resilient means.

16. The control valve according to claim 13, comprising a pair of resilient means engaged between said housing and said members and opposing the applied force and following movements thereof, respectively.

17. The control valve according to claim 16, comprising a pair of abutment means on said other member and housing, respectively, one of said resilient means normally urging said one member into engagement with one of said abutment means on said other member and the other of said resilient means normally urging said other member into engagement with the other of said abutment means, said one member being disengaged from said one abutment means upon the applied force movement thereof against said one resilient means and said other member being disengaged from said other abutment means upon the following movement thereof in response to the differential force against said other resilient means.

18. The control valve according to claim 17, wherein said one member is further movable against said one resilient means in response to the applied force toward a dumping position disengaged from said other member to effect complete exhaustion of the fluid pressure at said outlet port to said exhaust port, and an abutment on said housing predeterminately spaced from said other abutment means for engamement with said other member to limit the following movement thereof when said one member is in its dumping position.

19. The control valve according to claim 18, comprising holding means on said one member and movable into holding engagement with said housing upon the applied force movement of said one member against said one resilient means into its dumping position to mechanically contain the force of said one resilient means and maintain said one member in its dumping position thereby permitting the removal of the applied force from said one member.

20. The control valve according to claim 16, comprising valve means movable in said other member for engagement with said member to control pressure fluid communication between said inlet, outlet and exhaust ports, one of said resilient means normally urging said one member into engagement with said valve means to interrupt pressure fluid communication between said outlet and exhaust ports and urging said valve means toward a position establishing pressure fluid communication between said inlet and outlet ports, the applied force movement of said one member against said one resilient means permitting movement of said valve means toward another position in said other member interrupting pressure fluid communication between said inlet and outlet ports and said one member being thereafter further movable relative to said valve means to a position disengaged therefrom to establish pressure fluid communication between said outlet and exhaust ports and effect the metered reduction of the fluid pressure at said outlet port, and said valve means being subsequently re-engaged with said one member to interrupt the metered pressure fluid communication between said outlet and exhaust ports upon the following movement of said other member against the other of said resilient means in response to the differential force.

21. The control valve according to claim 20, comprising a valve seat on said one member between said inlet and outlet ports for engagement with said valve means, the applied force movement of said one member permitting movement of said valve means into engagement with said valve seat to interrupt pressure fluid communication between said inlet and outlet ports.

22. The control valve according to claim 21, comprising another valve seat on said one member and normally engaged with said valve means to interrupt pressure fluid communication between said outlet and exhaust ports, the applied force movement of said one member disengaging said other valve seat from said valve means to establish pressure fluid communication between said outlet and exhaust ports and effect the metered reduction of the fluid pressure at said outlet port subsequent to the engagement of said valve means with said first named valve seat, and said valve means being re-engaged with said other valve seat to interrupt the mettered pressure fluid communication between said outlet and exhaust ports upon the following movement of said other member in response to the differential force.

23. The control valve according to claim 22, comprising passage means in said other member between said inlet and outlet ports and extending through said first named valve seat, said valve means being movable in said passage means, said one member being movable in said other member and defining therewith said passage means, and exhaust passage means in said one member between said outlet and exhaust ports and extending through said other valve seat.

24. A control valve comprising a housing having a bore therein, spaced inlet and outlet ports in said housing and intersecting with said bore, a piston slidable in said bore between said inlet and outlet ports and having a peripheral groove therein connected in pressure fluid communication with said outlet port, another bore in said piston interposed between opposed counterbores, one of said counterbores being connected in open pressure fluid communication with said inlet port, a shoulder on said piston adjacent to the juncture of said other bore and said one counterbore defining a valve seat, another shoulder on said piston adjacent to the juncture of said other bore and the other of said counterbores, cross-passage means in said piston adjacent to said other shoulder and connected between said other counterbore and said groove means, abutment means on said housing, flange means on said piston means for engagement with said abutment means, resilient means engaged between said housing and said piston normally urging said flange means into engagement with said abutment means, other abutment means on said piston, another piston slidable in said other counterbore between the open end therof and said cross-passage means, other abutment means on said first named piston, other flange means on said other piston for engagement with said other abutment means, other resilient means engaged between said housing and said other piston normally urging said other flange means into engagement with said other abutment means, extension means on said other piston extending coaxially through said other bore and having a free end portion thereon in said one counterbore, another valve seat on said free end portion, an exhaust passage in said other piston and extension means having one end extending through said other valve seat and the other end thereof connected in open pressure fluid communication with the atmosphere, valve means movable in said one counterbore and normally urged into engagement with said other valve seat closing said exhaust passage, the engagement of said valve means with said other valve seat normally maintaining said valve means predeterminately spaced from said first named valve seat to establish open pressure fluid communication between said inlet and outlet ports, said other piston being initially movable against said other resilient means in response to an applied force to disengage said other flange means from said other abutment means and permit movement of said valve means into engagement with said first named valve seat interrupting pressure fluid communication between said inlet and outlet ports and being thereafter further movable relative to said valve means toward a position disengaging said other valve seat from said valve means to open said exhaust passage and effect a metered reduction of the fluid pressure at said outlet port therethrough to the atmosphere, and a pair of opposed areas on said first named piston respectively subjected to the fluid pressures at said inlet and outlet ports, one of said opposed areas being responsive to the fluid pressure at said inlet port and the other of said areas being responsive to the reduced fluid pressure at said outlet port upon the applied force movement of said other piston to establish a differential force urging said first named piston against said first named resilient means in follow-up relationship with said other piston to disengage said first named flange means from said first named abutment means and reengage said valve means with said other valve seat closing said exhaust passage and interrupting the metered pressure fluid communication therethrough between the outlet port and the atmosphere.

References Cited

UNITED STATES PATENTS

| | | | |
|---|---|---|---|
| 3,366,142 | 1/1968 | Bueler | 303—13 X |
| 3,403,699 | 10/1968 | Fites | 303—13 X |
| 3,419,315 | 12/1968 | Bueler | 137—627.5 X |

MILTON BUCHLER, Primary Examiner

JOHN J. McLAUGHLIN, Assistant Examiner

U.S. Cl. X.R.

137—596 2, 627.4; 303—13, 52, 54

UNITED STATES PATENT OFFICE
CERTIFICATE OF CORRECTION

Patent No. 3,532,396          Dated   October 6, 1970

Inventor(s)   Michael L. Carton

It is certified that error appears in the above-identified patent and that said Letters Patent are hereby corrected as shown below:

Column 3, line 56, after "said", first occurrence, insert -- piston --. Column 4, line 21, "Furher" should read -- Further --. Column 5, line 1, after "Por" insert -- is --; line 75, "abutement" should read -- abutment --. Column 6, line 60, after "means" insert -- being --. Column 7, line 67, "moveable" should read -- movable --; line 72, including -- chamber -- cancel down to and including -- other -- in line 73.

Signed and sealed this 12th day of September 1972.

(SEAL)
Attest:

EDWARD M. FLETCHER, JR.
Attesting Officer

ROBERT GOTTSCHALK
Commissioner of Patents